(12) United States Patent
Bianco

(10) Patent No.: US 7,171,619 B1
(45) Date of Patent: Jan. 30, 2007

(54) METHODS AND APPARATUS FOR ACCESSING DOCUMENT CONTENT

(75) Inventor: Joseph Bianco, Freehold, NJ (US)

(73) Assignee: SUN Microsystems, Inc., Santa Clara, CA (US)

( * ) Notice: Subject to any disclaimer, the term of this patent is extended or adjusted under 35 U.S.C. 154(b) by 793 days.

(21) Appl. No.: 09/899,653

(22) Filed: Jul. 5, 2001

(51) Int. Cl.
*G06F 15/00* (2006.01)
*G06F 17/00* (2006.01)

(52) U.S. Cl. .................. 715/526; 715/501.1; 715/513; 715/530; 707/7

(58) Field of Classification Search ............. 715/501.1, 715/513, 526, 530; 707/7
See application file for complete search history.

(56) References Cited

U.S. PATENT DOCUMENTS

| | | | |
|---|---|---|---|
| 5,671,381 A * | 9/1997 | Strasnick et al. | 715/848 |
| 6,006,227 A * | 12/1999 | Freeman et al. | 707/7 |
| 6,012,072 A * | 1/2000 | Lucas et al. | 715/526 |
| 6,098,064 A * | 8/2000 | Pirolli et al. | 707/2 |
| 6,253,218 B1 * | 6/2001 | Aoki et al. | 715/526 |

OTHER PUBLICATIONS

Card, Stuart K. et al., The WebBook and the Forager: an informational workspace for the World-Wide Web, ACM Conference o Human factors in computing systems: common ground, 1996, pp. 111-117.*

* cited by examiner

*Primary Examiner*—William Bashore
(74) *Attorney, Agent, or Firm*—Chapin IP Law, LLC; Barry W. Chapin, Esq.

(57) ABSTRACT

Mechanisms and techniques provide a system for accessing documents using a graphical user interface. The system can be employed in a web browser like software application. In operation, the system accesses document properties for a document. The document properties can indicate a size of the document, an age of the document, and a time associated with the document. The system can render a document selection display that provides a document identifier associated with the document. The document identifier can be render within a correlation framework that provides a visual correlation between values of document properties such as the size of the document, the age of the document, and a retrieval time associated with the document. The system can receive a user document selection associated with the document identifier indicating that a user desires to obtain the document associated with the document identifier. The system can then retrieving and display the document associated with the document identifier on the graphical user interface.

23 Claims, 9 Drawing Sheets

METHODS AND APPARATUS FOR ACCESSING DOCUMENT CONTENT

FIELD OF THE INVENTION

The present invention generally relates to systems for accessing contents of documents, and more particularly, to systems and techniques which provide a unique graphical user interface and a browser-like application that allows a user to access document content based on properties associated with the document.

BACKGROUND OF THE INVENTION

Advancements in computer and networking technologies have resulted in the creation of computer and information networks such as the Internet which interconnect many thousands of computer systems together to allow such computer systems to share information. Such computer systems can share information in the form of documents, files, streams of data or in other forms using a variety of communications protocols. One widely used suite of communications protocols provides a networked information or document sharing application which is generally referred to as the World Wide Web, or simply the "web." To access information on the web, a computer user typically operates a software application called a web browser on his or her computer system. In operation, a conventional web browser provides a graphical user interface that a user can operate to access information provided by web server software applications which operate on web server computer systems coupled to the computer network. The information that a user can access over the web can be in the form of web pages, documents, graphical images, files, or other types of data or information.

By way of example, a user can provide the identity of a particular document to a web browser in the form of a uniform resource locator or URL. A uniform resource locator contains information that a web browser requires to access a document or other information. A typical uniform resource locator may specify a communications protocol (e.g., the hypertext transport protocol or http) that a web browser is to use to retrieve a document identified within the URL and may also specify the name of the web server that can access, provide or "serve" that particular document to the web browser over a network. In response to receiving a URL containing this information, the web browser can use the designated communications protocol to access the specified web server to request and retrieve the document identified by the URL. When the designated web server receives such a request, the web server can respond by obtaining and returning the contents of the document specified in the request to the requesting web browser over the computer network. In many cases, the contents of the document is formatted according to a markup language such as the hypertext markup language or HTML. The web browser that receives the document can interpret the HTML contents of the document in order to properly render or display the contents within the web browser on the graphical user interface of the user's computer system for viewing by the user. The document content may include, for example, text content, graphical content (e.g., images), audio and/or video content, or other content, data or information.

The graphical user interface provided by a conventional web browser typically includes a browser window which the web browser uses to display the contents of documents, such as explained above. In addition to the browser window, a conventional web browser includes a variety of user-operable navigation buttons or commands (e.g., contained within pull-down menus) which allow the user to instruct the web browser which documents are to be retrieved from web servers. By way of example, many conventional web browsers include "back" and "forward" buttons that a user may select to cause the web browser to backup or move forward between the contents of previously viewed documents. This is called navigating the web. Conventional graphical user interfaces provided by web browsers also typically include an address bar which displays the URL of the document currently in view within the web browser window.

SUMMARY OF THE INVENTION

Conventional software applications such as web browsers which provide access to information such as the contents of a document over a computer network suffer from a variety of deficiencies. As an example, conventional web browsers lack the ability to discover and provide to the user extensive information about document properties or characteristics associated with a particular document on behalf of users requesting the document. More specifically, while conventional web browsers can access and display the internal content of a document, such web browsers lack the ability to determine and present to the user information concerning the document such as the age (e.g., seconds, minutes, hours, days, months or years) of the contents of that particular document, the time it may take to retrieve the contents of that document from a web server (such a time being determined prior to its actual retrieval), or the size (e.g., number of pages) of the contents of that particular document.

As an example of how such limitations restrict the usefulness and efficiency of a user accessing documents, consider a scenario in which a user operates a web browser to navigate the web to discover (e.g., via a search) a variety of documents on a particular subject. Conventional web browsers can simply display a list of the documents discovered (e.g., from a web page containing a formatted list of the document titles provided form a search engine web server). The web browsers however are unable to determine and present information concerning how old, and therefore how relevant each document is to that user, how many pages each document is, or how long it may take to retrieve the contents of each document from the web server(s) which can serve those documents to that user's web browser.

In many cases, a user may navigate his or her web browser to a search engine web site and may do a keyword search on a particular topic. The user may be seeking very specific information concerning many details related to the topic. In other words, the user may be seeking an on-point document that covers the topic of interest in great detail. In response to a keyword search query on the topic, a search engine web site may return a web page containing a list of documents located at various locations on the web that supposedly contain information related to the topic of interest to that user. However, by simply viewing the list of document titles alone without any temporal information concerning each document, such as each document's availability, size, age, and retrieval time, the user is unable to determine which documents are most likely to contain the information that user is seeking. For example, the user is unable to discern which documents in the list contain recently created subject matter on the topic (i.e., an age of the document) and that can be quickly obtained (i.e., a retrieval time associated with the document) and that contain detailed information (i.e., a page size) about the topic.

As a result of such deficiencies, the user is forced to attempt to retrieve each document in the search list individually, regardless of how long such a retrieval process may take. Long documents might take many minutes or hours to retrieve, depending upon the bandwidth available for transmission of data between the web browser and the web server serving the document. In some instances, a document may no longer be available at the location referenced by the search engine and thus the user may spend time waiting for the remote web server to provide a "document not found" or timeout error message. Only after the document is retrieved does the user have an appreciation for the retrieval time of the document, at which point this information is useless since the document has already been obtained.

Once retrieved, the user must review the contents of the document to determine such factors as the page count or size of the document and the age of the content within the document (and therefore its relevance) in the hopes that the user will find a document of interest. Some search engine web sites provide a document size in kilobytes that that user can view prior to retrieving the document. However, a document having a large size in kilobytes which may appear to be relevant to the user's search topic may be retrieved by the user only to find out that the document is actually a short one page document that contains a large graphic or figure which is not closely related to the search topic provided by the user.

Some search engine web sites provide a hit percentage indicating how frequently a search term provided by the user occurs in each particular document that contains that search term. However, while this may provide a rough indication to the user as to how relevant the document is to that user's search topic, the user still remains unaware of how old the information is within the document and how long it may take to retrieve the document from the web server. Stated more generally, conventional information retrieval techniques such as those employed in web browser technology lack the ability to provide a temporal context for the information that can be retrieved on behalf of a user. By temporal context, what is meant is a set of document properties related to a document or other information or data that provide an indication, for example, as to a retrieval time required to acquire the information, the age of the information, the size of the information, or other properties related to the information such as the author or source of the information and an indication of the contents of the information such as color, images, text, video, sound, multimedia and so forth. A temporal context of information thus describes characteristics or the nature of the information.

In contrast, the present invention can significantly overcome these and other deficiencies associated with conventional document or information access mechanism and techniques. Embodiments of the invention provide the ability to obtain, prior to a document's retrieval, document properties associated with the document which, when displayed to a user, provide a temporal context for the document associated with those document properties. In addition, the document properties are presented to the user in a unique and intuitive way such that the user can quickly grasp the temporal context of the document in comparison to other documents. As an example, embodiments of the invention can provide a graphical user interface that displays a graphical correlation between document properties associated with a document such as, for example, an age of the document, the size in pages of the document, and an approximate retrieval time required to obtain the document if the user desires to do so. By viewing such information, the user is able to make a more informed decision as to whether or not they should bother retrieving the contents of the document. Embodiments of the invention can display this document property information within the correlation framework for multiple documents, and thus the user can compare and contrast the document properties associated with different documents to determine, based on one or more document properties which the user decides are most relevant to decision, which document from the multiple documents should be accessed. In addition, embodiments of the invention can display multiple correlation frameworks for multiple sets of documents thus allowing a user to categorize documents into appropriate document sets associated with a particular correlation framework based on, for example, subject matter to which that document relates.

In particular, the system of the invention provides method embodiments which include methods for accessing documents using a graphical user interface. One such method comprises the steps of accessing document properties for a document. The document properties can indicate, for example, a size of the document, an age of the document, and a time, such as a retrieval time, associated with the document. Other document properties can exist as well. The method renders a document selection display that provides a document identifier associated with the document. The document identifier indicates, on the document selection display, a correlation between the size of the document, the age of the document, and the time associated with the document. This provides a temporal context for the document associated with the document identifier.

In one embodiment, the process of rendering a document selection display includes displaying a correlation framework including indices that provide a visual correlation between sizes of documents, ages of documents, and times associated with documents. The correlation display can be a three dimensional grid of axes, for example, with each axis having a scale of values for a specific document property (e.g., age, time, size). Alternatively, the correlation framework can be any type of display in which different properties can be represented using a scaling or unitizing technique. An example would be a three dimensional sphere or globe like image wherein radians and axes of the globe can represent scales of document property values. This embodiment can then display the document identifier within the correlation framework (i.e., as an image upon the graphical user interface, such as in the grid or within the sphere) at a location that indicates the size of the document, the age of the document, and a time associated with the document in relation to the indices of the correlation framework (i.e., in relation to the axes of the grid or sphere). In this manner, a user viewing the document identifier within the correlation framework is provided with an indication of document property relationships for the document associated with the document identifier, much like reading a graph of coordinates.

The embodiment can then receive a user document selection associated with the document identifier. The user document selection indicates that the user desires to obtain the document (e.g., view that documents content) associated with the document identifier. The method then retrieves the document associated with the document identifier. The retrieval process can include displaying the document's contents (or a portion thereof) on the graphical user interface for viewing by the user. In this manner, a user can first review document property relationships for a document prior to obtaining the document contents.

Other embodiments of the invention include a computer system, such as a computerized device, workstation, handheld or laptop computer, or other device configured with software and/or circuitry to process all of the method operations disclosed herein as embodiments of the invention. In such embodiments, the computer system includes a display, an input output interface (e.g., for receiving user input), a communications interface (e.g., a network interface), a memory (e.g., any type of computer readable medium), a processor and an interconnection mechanism connecting the display, the interface(s), the processor and the memory. In such embodiments, the memory system is encoded with a view manager application that when performed on the processor, produces a view manager process that causes the computer system to perform any and/or all of the method embodiments, steps and operations explained herein as embodiments of the invention. In other words, a computer that is programmed to operate as explained herein is considered an embodiment of the invention.

Other arrangements of embodiments of the invention that are disclosed herein include software programs to perform the method embodiment steps and operations summarized above and disclosed in detail below. As an example, a web browser software application configured to operate as explained herein is considered an embodiment of the invention. More particularly, a computer program product is disclosed which has a computer-readable medium including computer program logic encoded thereon that, when executed on at least one processor with a computing system, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within computer systems, computer program products and software applications manufactured by Sun Microsystems of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide mechanisms and techniques to allow a user to access the contents of a document based on a user decision made by viewing document properties associated with a document which can indicate, for example, an age of the document, a size (e.g., in pages) of the document, and/or a time associated with the document (e.g., a retrieval time required to obtain the document). Through the use of a unique and intuitive graphical user interface which correlates such document properties (e.g., age, size and time), embodiments of the invention allow a user to view a visual correlation between document properties (e.g., age, size, time or other document properties) associated with a set of documents in order to make a more informed decision as to which document to access from the set of available documents.

In particular, embodiments of the invention provide a web-browser like software application which, when operated (e.g., executed, interpreted or otherwise performed) upon a client (i.e., a user's) computer system, provides a graphical user interface that displays a correlation framework that can graphically correlate or graph document properties such as ages, sizes, and retrieval times for a set of documents against a set of document property axes which provide a scale of document property values. As an example, document identifiers for various documents can appear as plotted data points within a three dimensional document property grid. When a user operating the graphical user interface provided by such an embodiment views this visual correlation, the user is able to quickly and intuitively determine which document is most appropriate for their needs based upon which combination of document properties is most important to that user. In some embodiments, the user is able to graphically manipulate the correlation framework, such as by rotating and/or scaling it, in order to gain a further understanding of document property relationships. The user can thus determine which document from the set of documents is a preferable selection, and upon the user making such a selection, embodiments of the invention are able to access the contents of the document and present the contents to the user.

Figure 1:
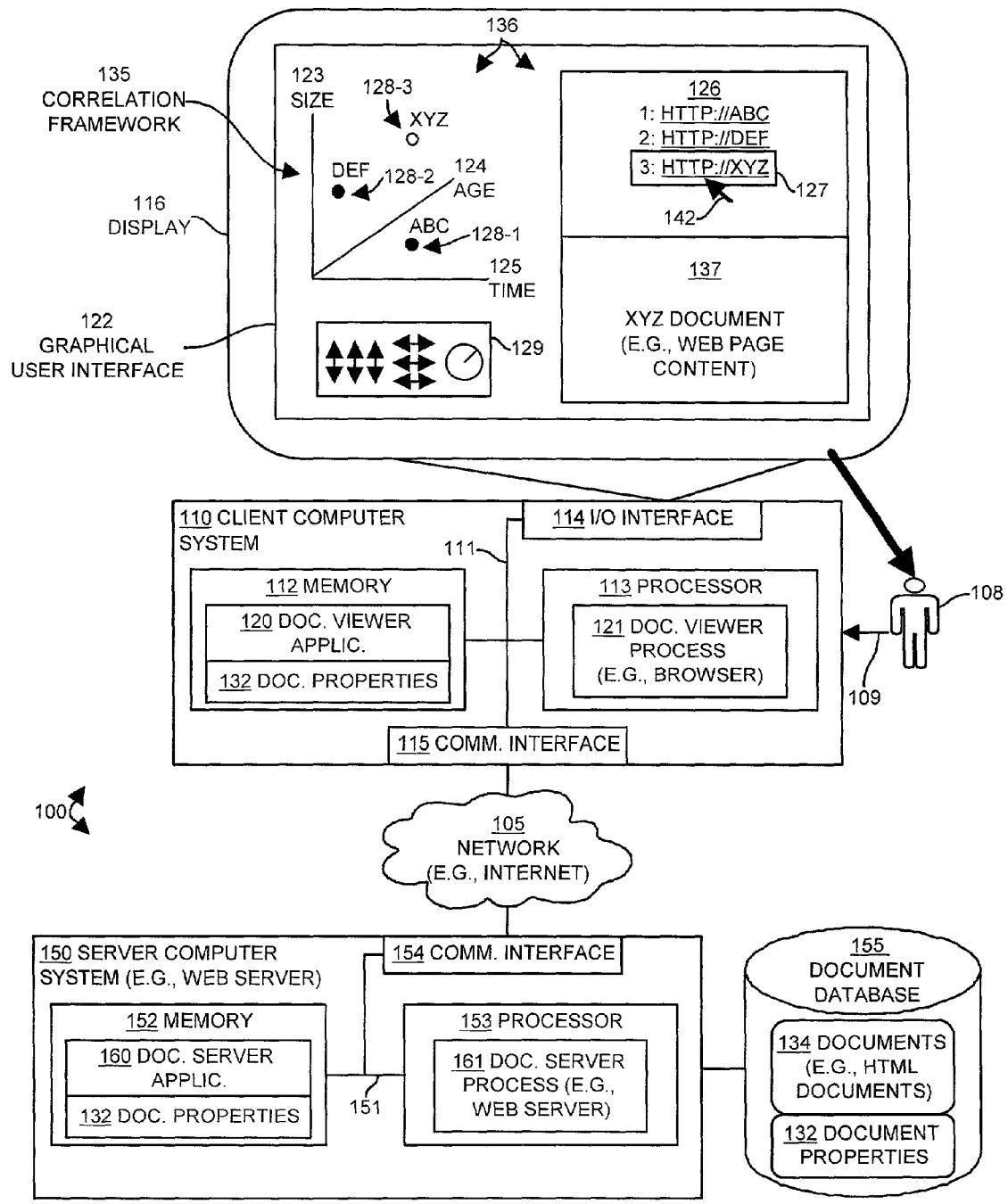
FIG. 1 illustrates an example computing system environment including a document viewer application and process and a document server application and process configured in accordance with embodiments of the invention.

FIG. 1 illustrates an example of a computing system environment 100 suitable for use in describing example operations of embodiments of the invention. The computing system environment 100 includes a computer network 105 such as the Internet which couples a client computer system 110 and a server computer system 150. The client and server computer systems 110 and 150 may be any type of computerized devices or systems such as personal computers, workstations, portable computing devices (e.g., laptop, palmtop or handheld computers) or the like. A single client computer system 110 and server computer system 150 are shown in this example for ease of description of the invention. It is to be understood that there can be many client and server computer systems 110 and 150 coupled via the network 105 which operate according to embodiments of the invention. The network 105 may be any type of computer or communications network that provides a communications medium such as networking cables and data communications devices such as routers, switches, and the like between the computer systems 110 and 150.

The example client computer system 110 includes an interconnection mechanism 111 (e.g., a data bus and/or circuitry) which couples a memory 112 (e.g., any computer readable medium such as random access memory (RAM) and/or read only memory (ROM) or even a disk or storage medium), a processor 113 (e.g., a microprocessor or central processing unit), an input/output interface 114 (e.g., peripheral device port(s) for a mouse, keyboard, etc.) and a communications interface 115 (e.g., modem or other network interface). The input/output interface 114 allows peripheral devices to be connected to the computer system 110. In this example, a display 117 such as a computer monitor or screen is coupled to the input output interface 114 and operates as part of the computer system 110. The client computer system 110 can render or otherwise display text and visual images such as the graphical user interface 122 for viewing by a user 108 (as shown by the arrow directed from the display 116 to the user 108). The communications interface 115 allows the computer system 110 to communicate with the server computer system 150 via the network 105.

The memory 112 is encoded with a document viewer application 120 and document properties 132. The document viewer application 120 is software code, data, data structures, classes, logic instructions or the like that embody the processing functionality, data and software operation of embodiments of the invention. The processor 113 can access the memory 112 via the interconnection mechanism 111 in order to launch, run, execute, interpret or otherwise perform the logic instructions of the document viewer application 120 in order to produce the document viewer process 121. In other words, the document viewer process 121 represents one or more portions of the document viewer application 120 (or the entire application 120) performing within or upon the processor 113 in the client computer system 110.

The document viewer process 121 produces the graphical user interface 122 on the display 116 during operation of the client computer system 110. In this example, the graphical user interface 122 includes a document selection display 136 that includes a correlation framework 135, one or more view controls 129, a document link display 126, and a content or document display area 137. The correlation framework 135 in this example is a multi-dimensional grid that includes three document property indices or axes 123 through 125. Each document property axes 123 to 125 provides a scale or range of values for a specific document property. In this example, the axis 123 is a scale for a "size" document property, whereas the axis 124 is a scale for an "age" document property, while the axis 125 is a scale of a "time" document property. The document link display 126 displays one or more user selectable document links (e.g., 127) that appear, in this example, as hyperlinked uniform resource locators (URLs) that reference various documents 134. For each link 127 in the document link display 126, the document viewer process 121 displays a corresponding document identifier 128 on or within the correlation framework 135. In this specific example, the document link "1: HTTP://ABC" corresponds to the document identifier 128-1 labeled "ABC" in the correlation framework 135, the document link "2: HTTP://DEF" corresponds to the document identifier 128-2 labeled "DEF", and the document link "3: HTTP://XYZ" corresponds to the document identifier 128-3 labeled "XYZ."

By viewing the correlation framework 135, the user 108 can quickly gain an intuitive understanding of values for the various document properties 123 to 125 associated with a particular document identifier 128 and therefore for a particular document 134 associated with that document identifier 128. The correlation framework 135 in this example thus provides a correlation between a size of the document 123, the age of the document 124 and the time (a document retrieval time in this example) associated with the document 125. In addition to the visual correlation of the document properties associated with a single document 134, the correlation framework 135 further provides an indication or comparison of document property relationships between a plurality of documents 134 each represented by a respective document identifier 128 within the correlation framework 135. By way of example, the user viewing the document identifier "XYZ" 128-3 can quickly understand that the size 123 (e.g., number of pages) of a document 134 associated with the document identifier "XYZ" 128-3 is larger than the size of a document 134 associated with either of the other document identifiers "ABC" 128-1 and "DEF" 128-2. In addition, the user 108 can further quickly understand or learn that the document 134 associated with the document identifier "XYZ" 128-3 is also older (as shown by the age document property axis 124) and will take a longer time to retrieve (retrieval time document property axis 125) than a document 134 associated with the document identifier "DEF" 128-2.

The view controls 129 within the document selection display 136 allow the user 108 to manipulate the correlation framework 135. As an example, the user 108 can operate the pointer 142 to select a view control 129 which causes the document viewer process 121 to graphically rotate, in real time, the correlation framework 135 within the graphical user interface 122. Such a rotation effect transforms the current visual correlation between document identifiers 128 provided on the correlation framework 135 to another visual correlation based on the user's operation of the view controls 129. Other view controls 129 can include scale view controls, resize view controls or the like. Essentially, the view controls 129 allow the user 108 to view the correlation framework 135 from different perspectives in order to compare document property values along the axes 123 through 125 associated with particular document identifiers 128. Three-dimensional graphical rotation algorithms can be used for this purpose thus allowing the user 108 to manipulate the view controls 129 in real-time while the document viewer process 121 updates the visual perspective of the correlation framework 135 in an animated manner. By viewing the correlation framework 135 from different angles or perspectives, the user 108 can compare and contrast different document properties associated with different documents 134 that correspond to the respective document identifiers 128 displayed within the correlation framework 135. This is aspect of embodiments of the invention assists the user in gaining an intuitive understanding of how the ages, sizes and retrieval times of specific documents 134 relate to each other and can assist the user 108 in making a more informed decision as to how relevant the contents of a particular document associated with a document identifier 128 may be.

To allow a user 108 to view the contents of a particular document 134 associated with a document identifier 128, the user 108 can select a document link within the document link display 126, as shown in this example by the selection 127 of the document link "3: HTTP://XYZ." The user 108 may make such a selection, for example, by operating an input device coupled to the computer system 110, such as a mouse or keyboard, to maneuver a pointer 142 onto the desired link (as shown by the selection 127 in this example) and by single-clicking the link 127. In doing so, the document viewer process 121 highlights the corresponding document identifier 128-3 "XYZ," as shown in this example by a hollow circle, to indicate that this particular document identifier 128-3 corresponds to the selected document link 127. Alternatively, to view a document's contents the user 108 may operate the pointer 142 to make a selection (e.g., a single-click) of a specific document identifier 128 (e.g., 128-3) within the correlation framework 135. In doing so, the document view process 121 highlights the corresponding document link 127, as shown in this example via a box surrounding the link 127, to visually indicate to the user 108 that this document link 127 corresponds to the selected document identifier 128-3.

In an alternative configuration, other techniques can be used to associate the document identifier 128 with a respective document link 127. For example, they could be color coordinated, or a mouse over effect could be implemented such that when the user moves a mouse pointer over a link 127 or a document identifier 128, the corresponding item (link 127 or identifier 128) can jitter, become bold, and the like.

In either case, when the user 108 desires to view the contents of the document associated with the selected document link 127 or the selected document identifier 128, the user 108 can operate a document access mechanism provided by the document viewer process 121. The document access mechanism may be invoked, for example, by double-clicking (e.g., via the pointer 142) either on a document link (e.g., 127) or on a document identifier 128 within the graphical user interface 122. In response, the document viewer process 121 obtains the contents of the document 134 corresponding to the selected document identifier 128 or the selected document link 127 and displays the contents of the document 134 in the content display area 137 of the graphical user interface 122. The contents of the document 134 may be cached locally within the memory 112 in the client computer system 110, in which case the document viewer process 121 accesses the contents of the document 134 from the memory 112. In most cases however, the document viewer process 121 obtains the contents of the document 134 from the document server process 161 operating within the server computer system 150 using a communications protocol such as HTTP over the network 105. In this manner, the document viewer process operates in a web browser-like fashion.

The server computer system 150 is configured in a manner similar to that of the client computer system 110 discussed above. However, the server computer system 150 includes a document server application 160 encoded within a memory 152 which, when performed by the processor 153, produces the document server process 161. The document server process 161 generally operates, for example, as a web server to serve contents of documents 134 to document viewer processes 121 which operate as clients or web browsers by providing requests for such documents 134 over the network 105. The server computer system 150 includes a coupling to a document database 155 which stores a plurality of documents 134 and which also stores document properties 132 related to the documents 134. The documents 134 may contain any type of information, content or data such as web pages, text files, audio files, video or multimedia encoded documents, database files or tables, streaming media content, and so forth. The document properties 132 are one or more files (or a database) that contain values for specific document properties such as ages, sizes, authors, current locations, or other characteristics or properties associated with the documents 134. Generally, the document server process 161 can receive requests over the network 105 to serve or otherwise provide the documents 134 and the document properties 132 to the document viewer process 121.

It is to be understood that embodiments of the invention include the document viewer application 120 (i.e., the unexecuted or non-performing logic instructions and/or data) encoded within a computer readable medium such as a floppy disk, hard disk or in an optical medium, or in firmware or, as in this example, as executable code within the memory 112 (e.g., within RAM). It is also to be understood that other embodiments of the invention comprise the document viewer application 120 operating within the processor 113 as the document viewer process 121. While not shown in this example, those skilled in the art should understand that the client computer system 110 may include other processes and/or components, such as an operating system.

Figure 2:
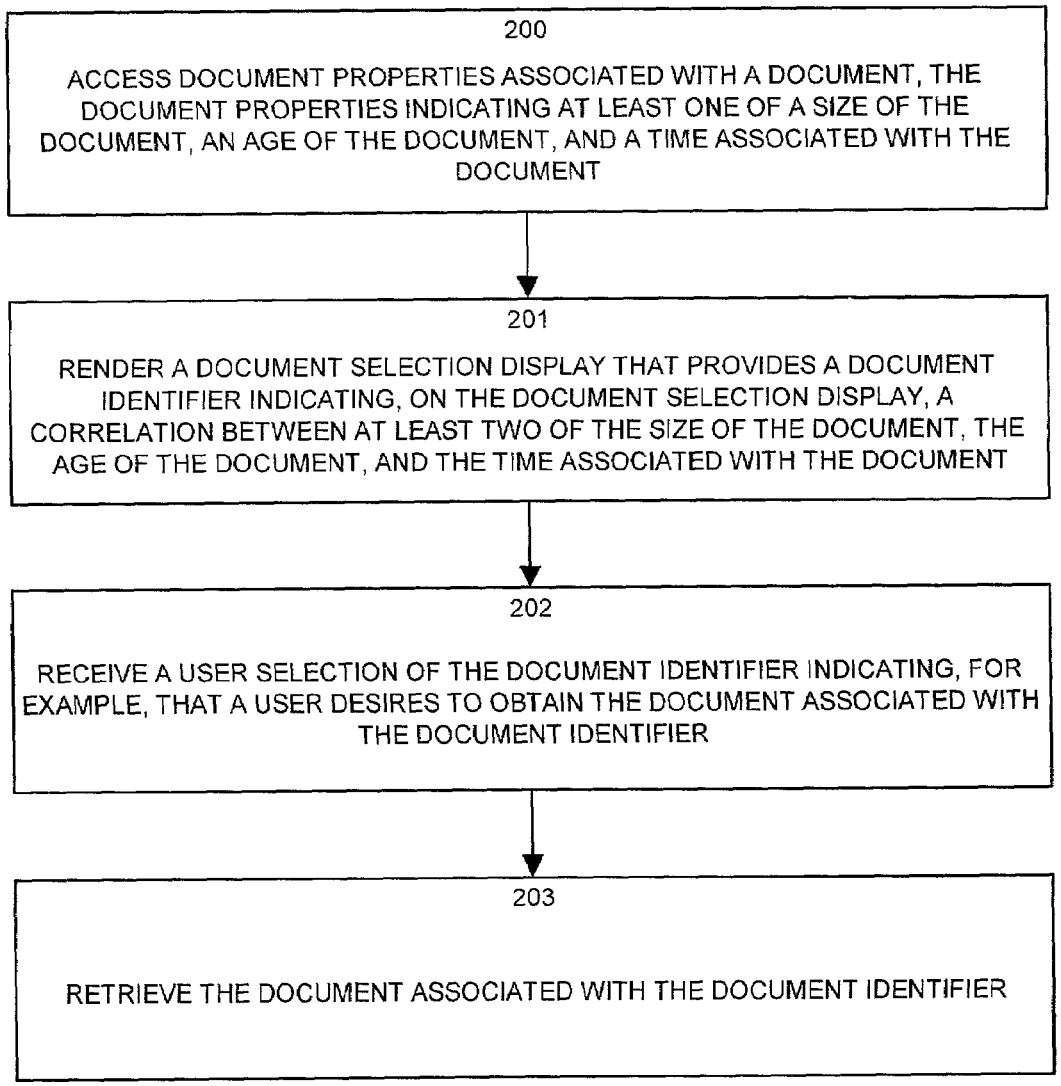
FIG. 2 is a flow chart of processing steps that can be performed by a document viewer process configured according to one embodiment of the invention.

FIG. 2 illustrates a flow chart of processing steps performed by the document viewer process 121 operating within the client computer system 110 configured in accordance with one example embodiment of the invention. Generally, the processing steps shown in FIG. 2 are explained with respect to the document viewer process 121 operating upon a single document 134 having a single document identifier 128 and an associated set of document properties 132.

In step 200, the document viewer process 121 accesses document properties 132 associated with a document 134. The document properties 132 in this example embodiment indicate at least one property such as a size of the document 134, an age of the document 134 and a time associated with the document 134. To access the document properties 132, the document viewer process 121 can, upon startup by the user 108, communicate over the network 105 with the document server process 161 operating within the server computer system 150 in order to request a current set (i.e., the current values) of document properties 132 for one or more documents 134. As an example, the document viewer process 121 can maintain (or be programmed beforehand with) a history, bookmark or favorites list of documents (e.g., a URL list) which the user 108 has pre-programmed for access (i.e., for future or subsequent viewing) by the document viewer process 121. For each document 134 identified in such a list, the document viewer process 121 can request the document properties 132 related to that document 134 from the document server process 161. The document server process 161 can respond by providing (i.e., serving) the document properties 132 for the document (or for multiple documents) to the document viewer process 121. The document viewer process 121 can then cache the document properties 132 in the memory 112 for future reference and processing as explained herein.

The document properties 132 for a document 134 in this example include a size of the document, an age of the document and a time associated with a document. The size document property can indicate, for example, how many pages of content exists within a document 134. Alternatively, the size document property may be expressed in any units of measurement such as a page count, image count, length (hours, minutes, seconds) of an audio or video clip, megabytes, kilobytes, or the like. The time document property, as an example, represents a retrieval time (e.g., hours, minutes, seconds) required to completely obtain the contents of a specific document 134. Alternatively, the time document property can represent a play time of an audio or video clip in which case the size document property for such content might indicate how much data storage (e.g., in kilobytes, megabytes or terabytes) the video or audio document may consume.

Techniques by which document properties 132 are actually calculated, computed or created will be explained in some detail later. For now however, aside from the time document property, it may be assumed that the document server process 161, or an author or creator of the document 134 (e.g., the creator of a web page) is responsible for maintaining, creating and/or initially calculating the specific values for the age and size document properties 132. As a specific example, within the HTML contents of an HTML formatted document, the document author or creator can provide an HTML comment field that can be used to indicate or contain values for various document properties such as the age of the document, page count when rendered, author, document type (e.g., color, image, text, video, audio, etc.) related to that document. When the document server process 161 receives a request for document properties, the document server process 161 can access the specified document to retrieve the first few lines of HTML statements from the document in order to parse the document properties, for example, from the HTML comment line(s) containing their values. The document server process 161 can then return these to the document viewer process 121.

The document viewer process 121 can calculate the time document property for a document 134, for example, based on an evaluation of communications bandwidth available between the document viewer process 121 and the document server process 161 over the network 105. As an example, the document viewer process 121 can "ping" the server computer system 150 over the network 105 to determine the data communications transmission speed or bandwidth available for transmitting data across the network 105 between the client and server computer systems 110 and 150. Thereafter, once the document viewer process 121 obtains the size document property for a particular document, a simple computation using the size of a document 134 in relation to the bandwidth or transmission speed available within the network 105 (obtained from the ping operation) can provide a value for the retrieval time document property that indicates a fairly close approximation of how long it may take the document viewer process 121 operating in the client computer system 110 to retrieve a specific document 134 from the server computer system 150.

Alternatively, the document viewer process can utilize the connection speed to the network 105 and the size of the document to compute how long it will take to connect and retrieve the document. In an alternative configuration, the document viewer process can use the size to provide a set of pre-calculated times that it might require to download a document of a certain size using various different connection speeds, such as 28.9 Kbps, 56 Kbps, and so forth.

In an alternative arrangement of step 200, the user 108 may provide a document property update command or signal to the document viewer process 121 which causes the document viewer process 121 to perform the operations generally explained above to access the document properties 132 associated with one or more documents 134. Alternatively, step 200 may be automatically and/or periodically performed or triggered to generate the update signal such that the document viewer process 121 automatically and periodically accesses the document properties 132 for one or more documents 134. Once the document viewer process 121 obtains access to the document properties 132, processing proceeds to step 201.

In step 201, the document viewer process 121 renders the document selection display 136 that provides a document identifier 128 indicating, on the document selection display 136 (e.g., in this example on the correlation framework 135 in FIG. 1) the correlation between at least two properties such as the size of the document, the age of the document, and the time associated with the document. As discussed above, this correlation allows a user 108 viewing the document selection display 136 within the graphical user interface 122 to gain an intuitive understanding of the relationship between the age, size and retrieval time associated with the document and as related to any other document identifiers 128 that may also be concurrently displayed within the document selection display 136.

Next, in step 202, the document viewer process 121 receives a user selection of a document identifier indicating, for example, that the user 108 desires to obtain the document 134 associated with the document identifier 128 (i.e., the selected document identifier). As discussed in the above example, the user may provide such selection by selecting, for example, the document identifier 128 which represents the document, or the user 108 may select a document link 127 in the link display 126 on the graphical user interface 122.

In step 203, in response to receiving the user selection of the document 134, the document viewer process 121 retrieves the document 134 associated with the selected document identifier (i.e., the document 134 associated with either the selected document identifier 128 or the selected document link 127). The retrieval process can include displaying the document contents 134 within the document display area 137 for viewing by the user 108.

According to the aforementioned processing, embodiments of the invention which perform such operations allow a user 108 to make a much more informed decision as to which documents 134 are to be selected for viewing as compared with conventional document access techniques which provide no indication of times, ages or sizes associated with documents. Such document properties 132 provide a temporal context for the documents 134 which allows the user to compare and contrast the different document properties 132 associated with different documents 134 in order to choose the document 134 which most closely fits a user's search or document access criteria. The user may, perhaps, prefer to view new documents over older documents and may prefer shorter documents or smaller documents over larger or longer documents. Since embodiments of the invention provide such a temporal context, the user 108 spends less time picking and choosing documents and reading them for relevant content since the document properties 132 operate to provide insight as to the content relevance for a particular document 134.

Figure 3:
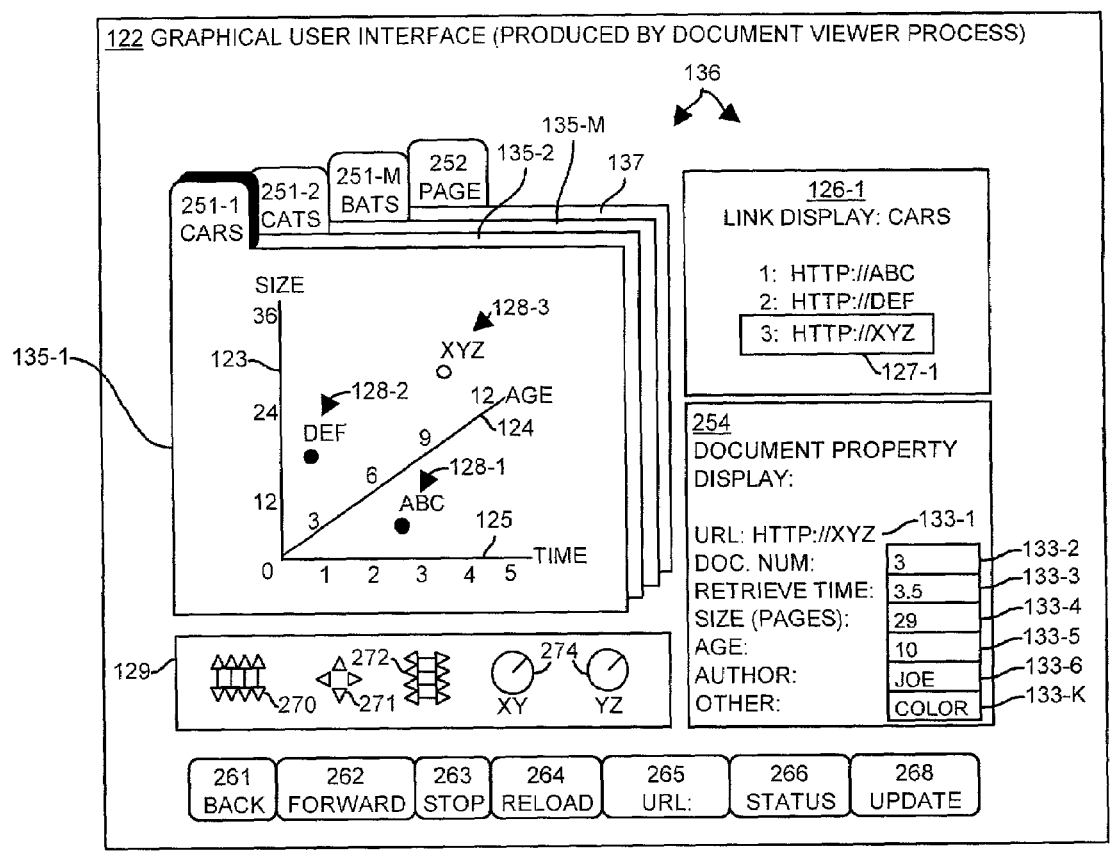
FIGS. 3 through 5 illustrate graphical user interfaces produced by a document viewer process configured in accordance with embodiments of the invention.
Figure 4:
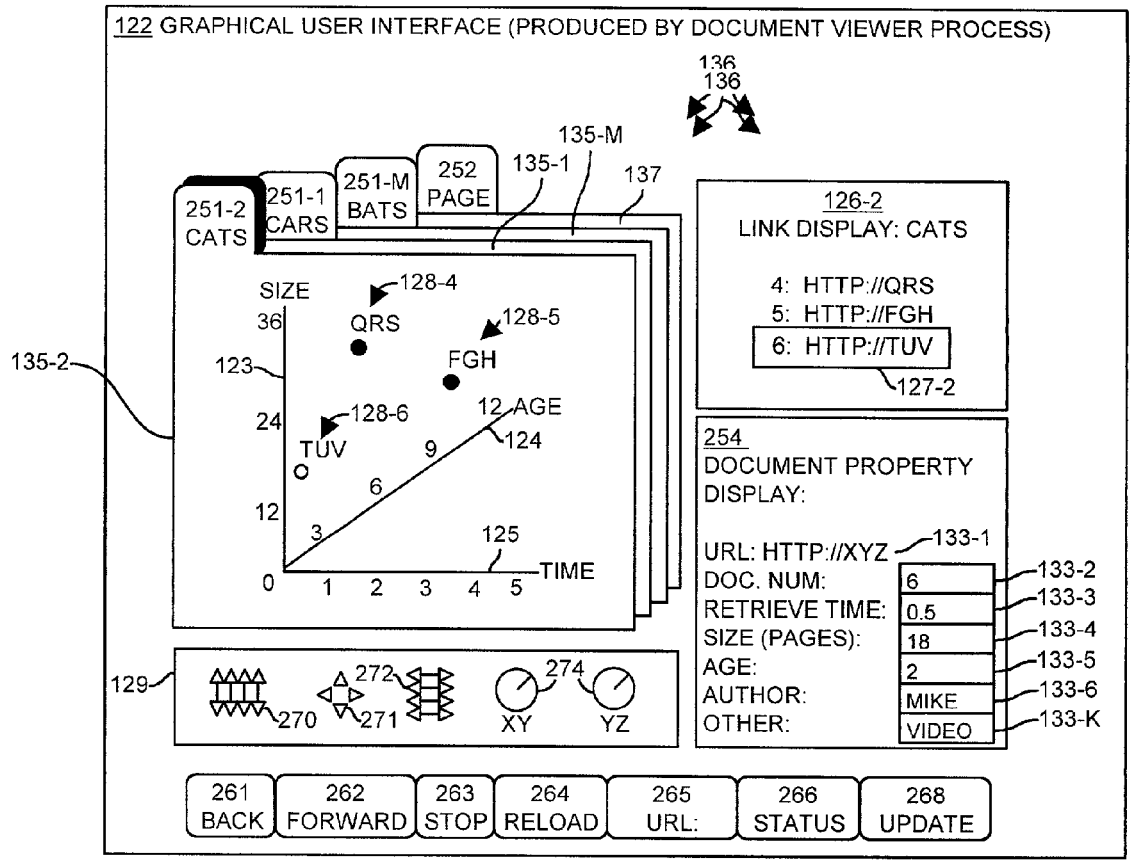
Figure 5:
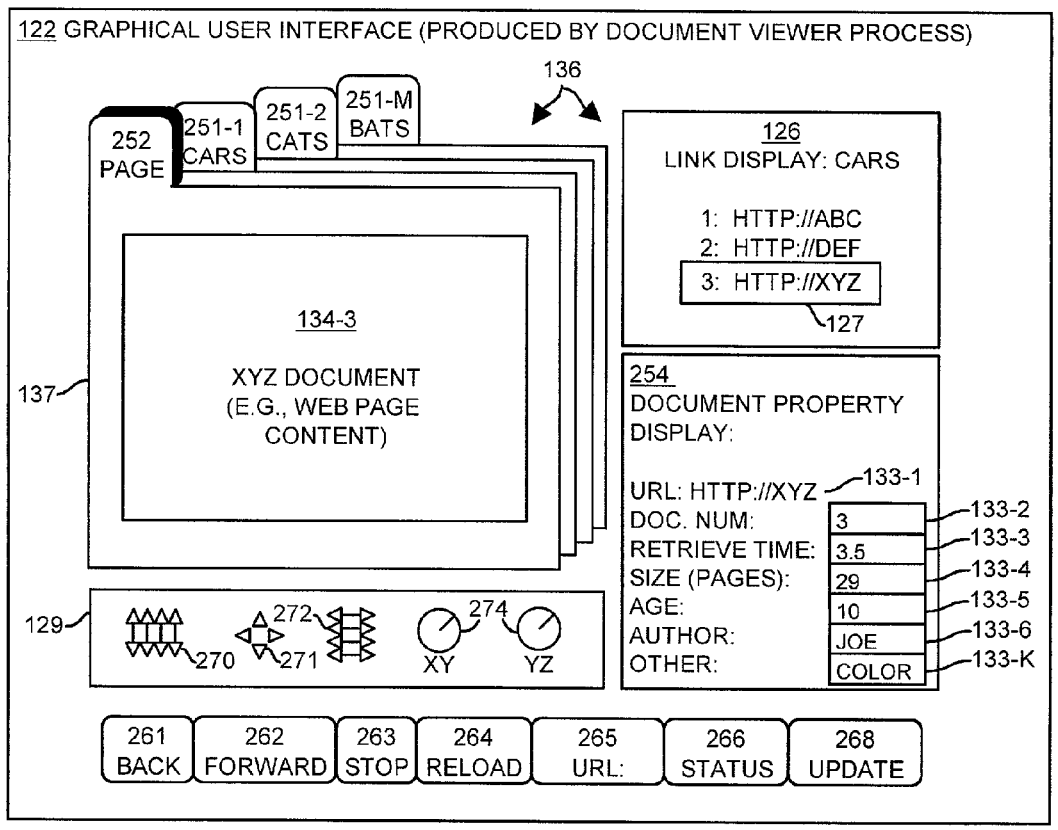

FIGS. 3 through 5 illustrate other embodiments of a graphical user interface 122 produced by the document viewer process 121 configured in accordance with various embodiments of the invention.

In FIG. 3 the graphical user interface 122 includes multiple selections 251-1 through 251-M of correlation frameworks 135-1 through 135-M. The correlation framework selections 251 are layered on top of one another. Each selection 251-1 through 251-M is associated with a respective correlation framework 135-1 through 135-M that provides (when selected) a correlation between document properties associated with a respective set of documents 134 that are related to that selection 251. In the illustrated example in FIG. 3, the visible (i.e., the uppermost or top layered) correlation framework 135-1 is associated with the "CARS" selection 251-1. Perhaps the user 108 previously operated the graphical user interface 122 to associate (e.g., to bookmark) documents 134 for each of the document identifiers 128-1 through 128-3 to the CARS correlation framework selection 251-1 since the documents 134 for these document identifiers 128-1 through 128-3 are related to the subject of automobiles. In other words, a particular selection 251 of a correlation framework 135 provides a categorization mechanism that a user 108 can use to associate a group or set of document identifiers 128 (and hence their associated documents 134, as well as their document links 127 as shown in the document link display 126-1, as previously explained above with respect to FIG. 1) in order to group the documents 134 associated with these document identifiers 128 into a common category or set. As will be explained shortly, the user 108 can select different selections 251 to view different correlation frameworks 135.

The embodiment of the graphical user interface 122 illustrated in FIG. 3 also includes a document property display area 254. The document property display area 254 displays the values 133-1 through 133-K for any document properties 132 associated with a selected document link 127 (e.g., 127-1 is selected in this example) or with a selected document identifier 128 which the user 108 can select from within the correlation framework 135. The document property display area 254 thus allows a user 108 to see the specific alphanumeric values 133 assigned to each document property 132 associated with a document 134 corresponding to a respective selected document identifier 128 or document link 127.

In the example in FIG. 3, the user 108 selects, via a single-click of the pointer 142 for example, the document link "3: HTTP://XYZ" 127-1. In response, the document viewer process 121 highlights the corresponding document identifier "XYZ" 128-3 within the correlation framework 135-1 and concurrently obtains and displays any of the values 133-1 through 133-K for any document properties 132 associated with the document 134 that corresponds to the selected link 127-1 and/or document identifier 128-3. In this example, the document property display 254 includes the value of the URL 133-1 associated with a particular document (HTTP://XYZ in this example), as well as a document number 133-2 which corresponds to the number of the selected document in relation to the list of document links displayed within the document link display area 126. Also shown are specific document property values 133 for the retrieval time 133-3, size in pages 133-4 and age 133-5 of the particular document 134 that corresponds to the document link or document identifier selection 127 and 128 to which these document properties (in the document property display 254) relate.

Furthermore, the document property display area 254 can display other document property values (e.g., 133-6 through 133-K) for document properties which are not correlated or used within the correlation framework 135. In this example, the name of the author of the document "JOE" 133-6 is shown within the document property display area 254, as well as the values of other properties 133-K. The other properties 133-K in this example include, for example, an indication as to the content (color in this example) of the document 134 associated with a particular selection 127, 128. The document properties display area 254 may thus indicate to the user 108 both correlated (via the correlation framework 135) and non-correlated characteristics of a document 134 which may prompt the user to select that document 134 for viewing over another with different document characteristics.

The graphical user interface 122 illustrated in the example in FIG. 3 also includes navigational controls 261, 262 which allow the user 108 to go backwards (BACK 261) and forwards (FORWARD 262) between views of documents 134 that have been recently accessed. Other controls 263 and 264 allow the user 108 to stop loading (STOP 263) or to reload (RELOAD 264) the contents of a document 134 during a document rendering process. In addition, the graphical user interface 122 includes a URL field 265 which displays the current URL of any document content 134 being viewed within the graphical user interface 122. A status field 266 provides a progress bar or other indicator as to the progress made in accessing (e.g., loading and rendering) document properties or the contents of a particular document 134.

The update control 268 allows the user 108 to control when the document viewer process 121 communicates with the document server process 161 in order to retrieve the current set of document properties 132 for a particular correlation framework 135. As an example, the user 108 can select or activate the update control 268 at any time to produce an update signal. Activation of the update control 268 causes the document viewer process 121 to obtain the document identities for each document identifier 128 within the correlation framework 135 and then to send these document identifiers (e.g., as a list of URLs) to the document server process 161. In response, the document server process 161 obtains the most up-to-date document property values 133 for the documents 134 associated with these document identifiers 128 and returns the values with the document properties 132 back to the document viewer process 121.

The graphical user interface 122 further includes a set of view controls 129 which include up/down arrows 270, document identifier navigation view controls 271, right/left view controls 272, and horizontal and vertical rotation view controls 274 (XY and YZ plane view controls). The various view controls 270 through 274 allow the user to manipulate the visible correlation framework 135 in real time in an animated manner in order to view the correlation framework 135 from different visual perspectives. For example, the user 108 might operate the XY rotational view control 274 to rotate the correlation framework 135 in a real time and/or graphically animated manner along an imaginary XY (e.g., vertical) view plane. This allows the user 108 to obtain a better understanding of the visual correlations between the document properties associated with particular document identifiers 128 in relation to the indices 123 through 125 within the correlation framework 135 by viewing the correlation framework 135 from different angles.

Using the graphical user interface 122 in FIG. 3, the user 108 may also provide different selections 251-1 through 251-M of different correlation frameworks 135-1 through 135-M. As illustrated in the example in FIG. 3, the user has chosen the "CARS" selection 251-1 in order to view the correlation framework 135-1 containing document identifiers 128-1 through 128-3. To view a different correlation framework 135, the user 108 may select, for example, the CATS selection 251-2 to view the correlation framework 135-2. In response to receiving the CATS selection 251-2, the document viewer process 121 displays the correlation framework 135-2 which includes indices 123-4 through 125-6 which are scaled to a second set of document properties (e.g., possibly a different range of sizes, ages and times) for a second set of documents. Such a second set of document might be related to cats, for example.

FIG. 4 illustrates how the graphical user interface 122 from FIG. 3 appears (i.e., is transformed) when the document viewer process 121 receives the CATS selection 25'-2 from the user 108 on the graphical user interface 122 in FIG. 3. In FIG. 4, the graphical user interface 122 contains a document selection display 136 that displays the CATS correlation framework 135-2 that includes document identifiers 128-4 through 128-6 associated with documents 134 related to cats. Also, the document viewer process 121 modifies the document link display 126-1 (from FIG. 3) into the document link display 126-2 (FIG. 4) to contain document links (e.g., 127-2) associated with documents 134 for which document identifiers 128-4 through 128-6 are shown in the CATS correlation framework 135-2. In this manner, the user 108 can select different selections 251 to view different correlation frameworks 135. Each correlation framework can provide a visual correlation between the document properties associated with a respective set of documents, so that the user 108 can compare the document properties within a particular correlation framework to make a more informed document selection.

Once the user 108 has made an appropriate selection 251 of the correlation framework 135 and thereafter makes a selection of either a document link 127 or its corresponding document identifier 128 within the visible correlation framework 135, the user can activate a document access mechanism within the document viewer process 121 such as, for example, by double-clicking on either the document link 127 or the document identifier 128. In response, the document viewer process 121 proceeds to access the contents of the document 134 associated with the selected link 127 or document identifier 128 on the document server process 161. A protocol such as HTTP may be used as the document access mechanism to access the contents of the document 134 associated with the user selection. When the user provides the selection of a document link 127 or document identifier 128 in this manner, the document viewer process 121 obtain the contents of the document and displays the contents within the document display area 137 as illustrated in FIG. 5.

FIG. 5 illustrates how the document viewer process 121 transitions the graphical user interface 122 in shown in FIG. 3 to a graphical user interface 122 that displays the contents of a document 134 (contents for the XYZ document 134-3 in this example) within the document display area 137. In this example, the user 108 has selected either the document link 127-1 or the document identifier 128-3 for the XYZ document 134-3 from the graphical user interface 122 illustrated in FIG. 3. When the user 108 provides such a user document selection, the document viewer process 121 retrieves the document associated with the selected document identifier (the link 127 or the identifier 128 within the correlation framework 135) and proceeds to display the document display area 137 on the graphical user interface 122 in a layered manner over the top of the selections 251 of the various correlation frameworks 135. Once the contents of a document 134 are retrieved (e.g., via HTTP) from the document server process 161, the document viewer process 121 displays the contents 134 in the document display area 137 for viewing by the user 108. In this manner, the user 108 is able to navigate a set of links 127 and document identifiers 128 using the visual correlations provided by the correlation frameworks 135-1 through 135-M associated with each selection 251-1 through 251-M. In response to a user selection by particular document, the document viewer process 121 can display the contents of the document 134 graphically over the correlation frameworks 135. Since the selections 251 of the various correlation frameworks 135 are still visible on the graphical user interface 122 (e.g., as selectable tabs), the user can return to the previous selection 251 to view the contents of another selected document 134. In this manner, embodiments of the invention operate using conventional browser technology to obtain documents for the document server process 161 but provide a unique presentation interface with which a user 108 can navigate through a set of documents and for which the user can display contents of the document in a unique manner.

Figure 6:
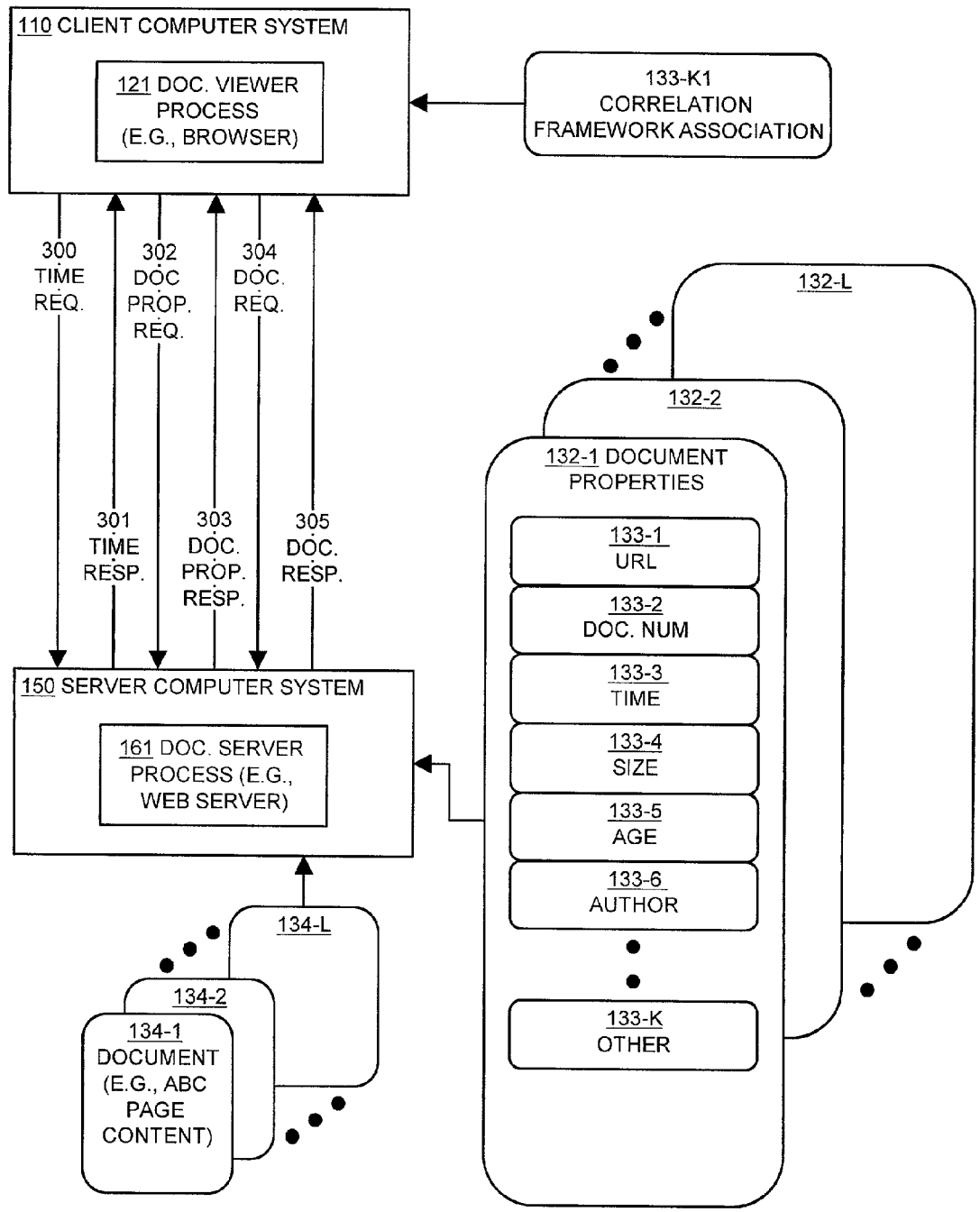
FIG. 6 illustrates an example of communications which can take place between a document viewer process and a document server process configured according to embodiments of the invention.

FIG. 6 illustrates an example of communications that can take place between a document viewer process 121 and a document server process 161 configured according to embodiments of the invention in order to obtain the values 133 of document properties 132 for one or more documents 134, and to obtain the contents of the documents 134. In particular, the communications 300 to 303 typically occur upon initial startup (i.e., initial execution) of the document viewer process 121, or, in response to the user 108 operating the update command 268 (FIG. 4 in 5) in order to obtain and update of the document properties 132 for one or more documents 134.

Also as illustrated in FIG. 6, the document viewer process 121 may maintain a correlation framework association document property 133-K1 which indicates, for this particular document viewer process 121, which documents 134 are to be associated with which particular correlation frameworks 135. For example, when the user 108 decides to associate a specific document 134 to a specific correlation framework 135 (e.g., via a book marking operation), the document viewer process 121 stores the correlation framework association document property 133-K1 for that document 134 indicating the identity of the particular correlation framework 135 that is to display a document identifier 128 associated with that document 134. In this manner, whenever the document viewer process 121 displays a correlation framework 135, the process 121 can traverse the entire set of correlation framework association document properties 133-K1 to identify all documents associated with the currently visible correlation framework 135. When each document is detected, the document viewer process 121 can map a document identifier 128 onto the correlation framework 135 at the corresponding document property locations for the document properties (e.g., age, time and size) which that correlation framework 135 correlates.

FIG. 6 also illustrates communications 304 and 305 that take place between a document viewer process 121 and the document server process 161 to obtain the contents of the document 134. The processing which occurs to cause the communications 300 to 305 to be carried out between the document viewer process 121 and document server process 161, as well as details of the processing of an example embodiment of the document viewer process 121 will now be explained with respect to FIGS. 7 through 9.

Figure 7:
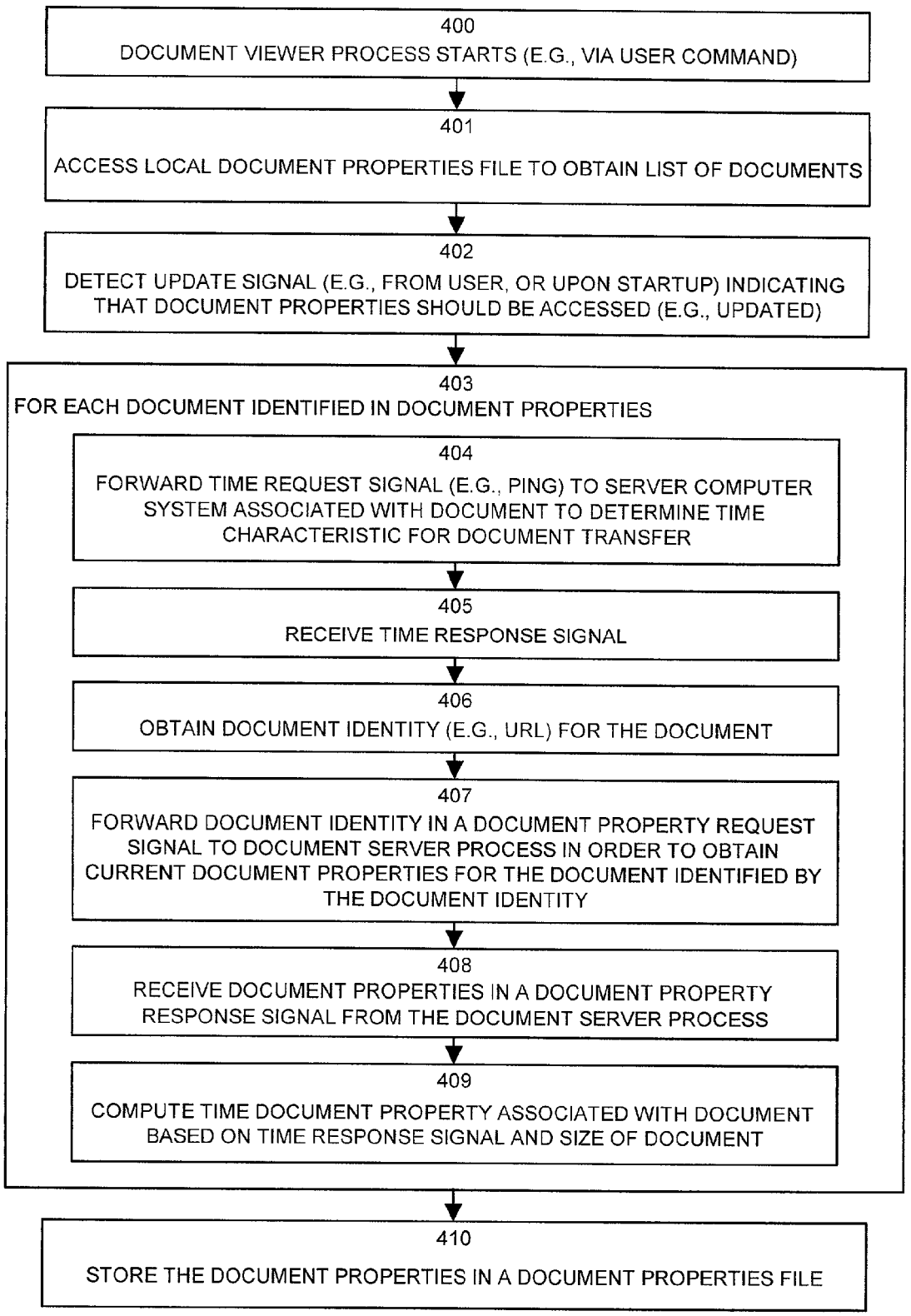
FIGS. 7 through 9 are a flow chart of processing steps that a document viewer process can perform according to one example embodiment of the invention.
Figure 8:
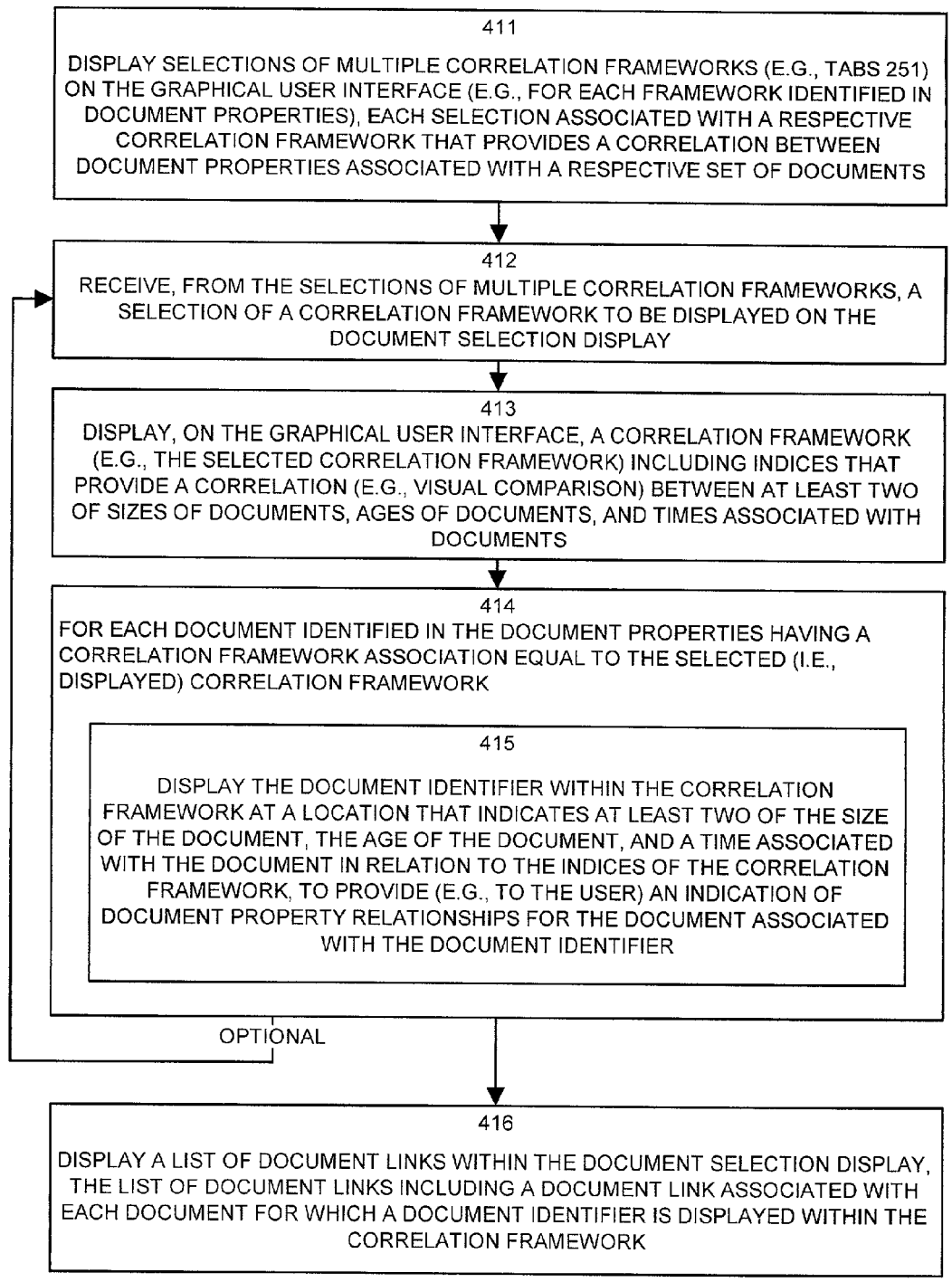
Figure 9:
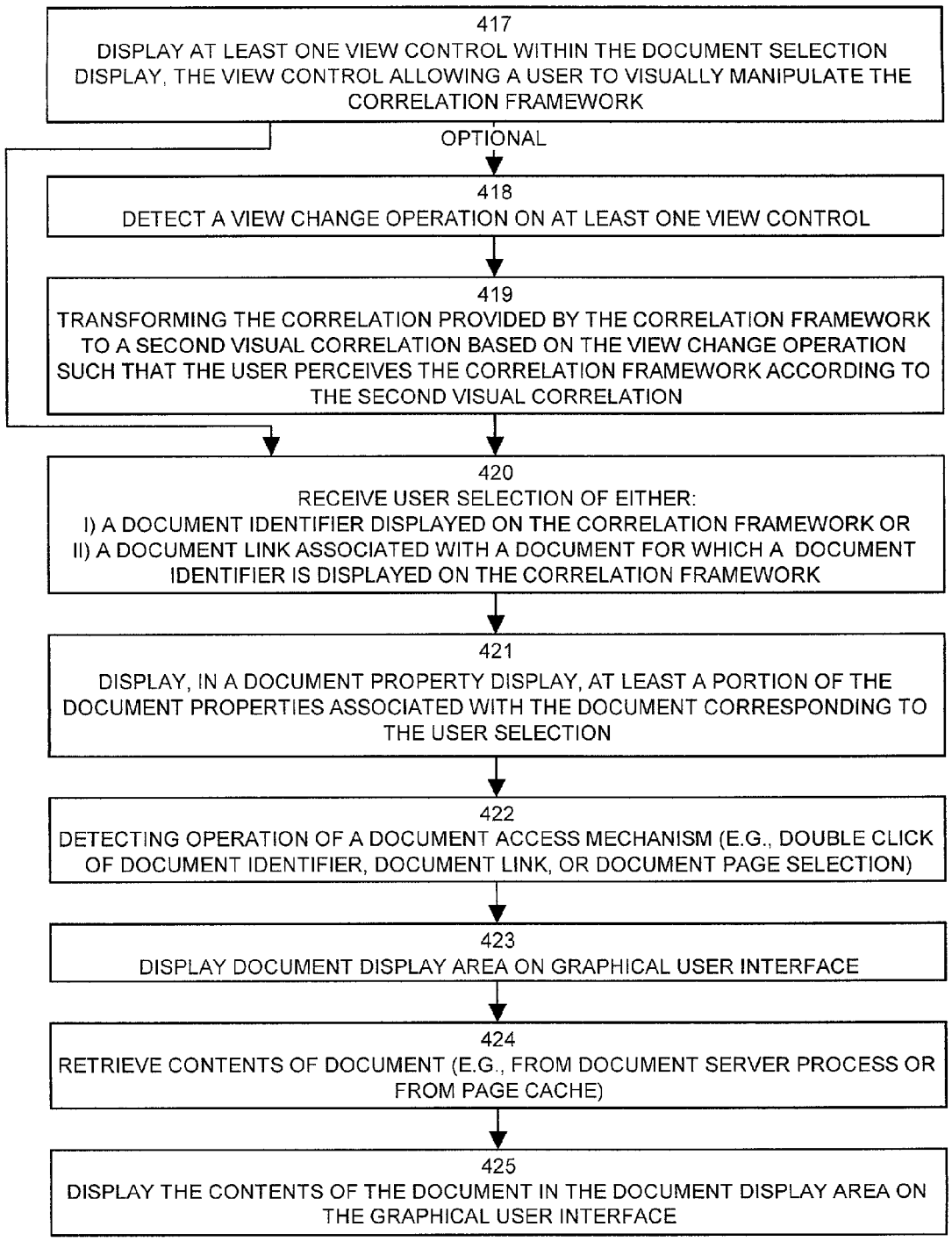

FIGS. 7 through 9 provide a flow chart of processing steps performed by a document viewer process 121 configured according to one example embodiment of the invention. It is to be understood that the processing steps shown in FIGS. 7 through 9 are meant to illustrate one example embodiment of the invention and are not limiting to other embodiments.

In step 400, the document viewer process 121 starts operation within the client computer system 110. This may occur in response to a user 108 launching or otherwise executing the document viewer application 120.

In step 401, the document viewer process 121 accesses a local document properties file to obtain a list of documents 134 for which document properties 132 are to be obtained. A local document properties file may contain, for example, a list of document URLs which identify each document that a user 108 has previously associated with a correlation framework 135.

Next, in step 402, the document viewer process 121 detects an update signal indicating the document properties 132 associated with one or more documents 134 should be accessed or updated. The update signal may be in response to the user operating the update command 268 on the graphical user interface 122, or, the document viewer process 121 may automatically and/or periodically generate the update signal, for example, upon startup of the document viewer process 121. By clicking the update command 268, the user 108 can instruct the document viewer process 121 to update all document properties 132, or, if a single document is selected or is in view in the document display area 137, an update command 268 may cause the document viewer process to update properties only for that document 134 in view. For this example, assume all document properties for a plurality of documents 134 are to be updated.

Next, in step 403, the document viewer process enters a loop of processing steps 404 through 409 that operate to obtain the document properties 132 for each document specified in the list of document identities obtained in step 401. The purpose of the loop formed by step 403 is to obtain the most recent or current set of document properties 132 for each document 134 that is to have a corresponding document identifier 128 displayed within a correlation framework 135. The update processing thus accounts for any document properties that may have changed since the last time the user 108 viewed the correlation framework 135.

In step 404, the document viewer process 121 forwards a time request signal 300 from the client computer system 110 to the server computer system 150 associated with the current document (i.e., the document 134 being processed in this iteration of the loop started in step 303) to determine a time characteristic for document transfer associated with that document 134. The time request signal 300 may be, for example, a network "ping" command sent to a network address associated with the server computer system 150 that serves that document 134. In response, the server computer system 150 can supply a time response signal 301 back to the document viewer process 121.

In step 405, the document viewer process 121 receives the time response signal 301. The time response signal 301 may be, for example, the response to the ping command which the document viewer process 121 can use to calculate an approximate data transmission rate or bandwidth for data transmitted between the client and server computer systems 110 and 150.

In step 406, the document server process 121 obtains the document identity, such as a URL, for the current document being processed in this iteration of the loop formed by step 303.

Next, in step 407, the document viewer process 121 forwards the document identity in a document property request signal 302 to the document server process 161 in order to obtain the current values 133 of the document properties 132 for the document 134 identified by the document identity (i.e., as specified by a URL).

In step 408, the document server process 161 provides a document property response signal 303 back to the document viewer process 121 and the document viewer process receives the values 133 of the document properties 132 in the document property response signal 303. In this manner, the document viewer process 121 is able to receive the most up-to-date or current set of document properties 132.

Next, in step 409, the document viewer process 121 computes a value 133-3 for the time document property associated with the document based upon the time response signal 301 and a value 133-4 of the size of the document as obtained from the document properties 132. In other words, in step 309, the document viewer process 121 determines an approximate retrieval time (e.g., in seconds) which might be required to retrieve the document if the user desires to do so. The document viewer process 121 can compute the time document property by dividing the size of the document (or another size metric based on the size document property) by the current time response signal (i.e. by the available bandwidth).

The document viewer process 121 repeats the processing operations of steps 404 to 409 for each document identified in step 401 which results in obtaining all available document properties 132 for any documents that are to be represented by document links 127 and corresponding document identifiers 128 (e.g., within a correlation framework) within the graphical user interface 122.

Next, after processing the loop in step 403, processing proceeds to step 410 at which point the document viewer process 121 stores the document properties 132 in a local document properties file (i.e., 132 in memory 112) for access during operation of the graphical user interface 122. After processing step 410, the processing of the document viewer process 121 proceeds to step 411 at the top of FIG. 8.

In FIG. 8 in step 411, the document viewer process 121 displays selections of multiple correlation frameworks (e.g., selections 251-1 through 251-M) on the graphical user interface 122. The document viewer process 121 can determine how many different selections 251 of correlation frameworks 135 are to be displayed by providing a correlation framework 135 for each different value of the correlation framework association document property 133-K1 for all accessible documents (e.g., all documents contained in a bookmark or favorites file). Recall that the correlation framework association document property 133-K1 indicates which correlation framework a particular document is to be identified with by a document identifier 128. Each selection 251 represents a respective correlation framework 135 that provides a visual correlation between document properties associated with a respective set of documents. In other words, the set of documents associated with a particular correlation framework 135 all share a common value for their correlation framework association document property 133-K1.

Next, in step 412, the document viewer process 121 receives, from the selections 251-1 through 251-M of multiple correlation frameworks 135-1 through 135-M, a selection 251 of a particular correlation framework 135 to be displayed on the document selection display 136 within the graphical user interface 122. Upon initial startup, the document viewer process 121 may specify a default correlation framework 135 that should be initially displayed. Alternatively, the user 108 may specify the particular selection 251 of a particular correlation framework 135 that is to be the initial correlation framework displayed.

In step 413, the document viewer process 121 displays, on the graphical user interface 122, the correlation framework 135 (i.e., the selected correlation framework). The correlation framework 135 includes indices (e.g., 123 through 125) that provide a visual correlation between at least two properties, such as sizes of the documents, ages of the documents and times associated with the documents. It is to be understood that these document properties are representative of document properties that can be used with the correlation framework 135 and that more or less or different properties could be represented by indicies. Alternative configurations of embodiments of the invention are not limited to these property types. For example, a correlation framework might contain indices for such document properties as authors (e.g., Joe, Mike, etc.), document types (e.g., color, non color, figures, text, video, audio, etc.) or others. Such a correlation framework 135 can provide insight into how documents relate to each other without having to access the documents in their entirety.

In step 414, the document viewer process enters a processing loop which occurs for each document identified in the document properties 132 having a correlation framework association document property 133-K1 that is equal to the selected (i.e., the displayed) correlation framework 135.

Within the processing loop defined by step 414, in step 415, the document viewer process 121 displays a document identifier 128 within the correlation framework 135 at a location that indicates at least two properties of the documents, such as the size of the document, the age of the document, and a time associated with the document, in relation to the indices of the correlation framework 135, such that, for example, a user 108 viewing the document identifier 128 within the correlation framework 135 is provided with an indication of document property relationships for the document 134 associated with the document identifier 128. In other words, in step 415, the document viewer process 121 plots, displays, renders or otherwise provides the document identifier 128 at the appropriate location within the correlation framework 135 on the graphical user interface 122. In the examples previously explained with respect to FIGS. 1, 4 and 5, the document identifiers 128 included a labeled point or dot on the correlation framework 135 rendered at a location corresponding to the values of the document properties as represented by the document property indices 123 through 125 of the correlation framework 135.

At this point in processing, the document viewer process 121 has displayed a particular correlation framework 135 and has displayed the document identifiers 128 associated with that correlation framework 135 within that correlation framework 135. At the discretion of the user 108, processing can now optionally return to step 412 in the event that the user 108 provides a different selection 251 in order to view a different correlation framework 135. Assuming for this example that the user does not provide a different selection 251 of another correlation framework 135, processing proceeds to step 416.

In step 416, the document viewer process 121 displays a list 126 of document links 127 within the document selection display 136. The list of document links 126 corresponds to the link display area 126 previously explained. The list of document links 126 includes a document link 127 associated with each document 134 for which a document identifier 128 is displayed within the correlation framework 135 (i.e., the visible or top layered correlation framework). In other words, in step 416, the document viewer process 121 displays a list of document links 127 for all of the documents for which a correlation is shown in the correlation framework 135. Thereafter, processing proceeds to step 417 at the top of FIG. 9.

In FIG. 9, in step 417, the document viewer process 121 displays at least one view control within the document selection display 136. The view control 129 (or one or more of 270 through 274) allows the user 108 to manipulate the correlation framework 135. If the user desires to manipulate the correlation framework 135, processing proceeds the steps 418 to 420. Since this process is optional, processing may also proceed from step 417 to step 420. For completeness however, the operation of visual manipulation of the correlation framework 135 will be explained next.

In step 418, the document viewer process 121 detects a view change operation on at least one view control 129. As an example with respect to the graphical user interface 122 illustrated in either of FIG. 4 or 5, the user may operate the up-down arrow view control 270, or the right left arrow view control 272 in order to scroll or rotate the correlation framework 135 up, down, left or right.

In step 419, the document viewer process 121 transforms the visual correlation provided by the correlation framework 135 to a second visual correlation based on the view change operation (received from the user 108 during operation of the view control 129) such that the user 108 perceives a correlation framework 135 according to the second visual correlation. In other words, in step 419, the document viewer process 121 changes the correlation framework 135 as specified by the user's operation of the view control 129. This may happen concurrently with step 418 such that the changes occur in real-time using graphical animation techniques to visually modify the correlation framework 135 on the screen in an animated manner while the user 108 operates the view control 129.

Next, in step 420, the document viewer process 121 receives a user selection, such as a single-click, of either a document identifier 128 displayed on the correlation framework 125 or a document link 127 associated with a document 134 for which a document identifier 128 is displayed on the correlation framework 135.

In step 421, the document viewer process 121 displays in the document property display 254, at least a portion (e.g., some or all) of the document properties 132 (and the document property values 133) associated with the document 134 corresponding to the user's selection from processing step 420.

In step 422, the document viewer process 121 detects operation of a document access mechanism such as, for example, the user double-clicking (versus single-clicking) on either a document identifier 128 within the correlation framework 135 or on a document link 127 within the document link display 126 or by selecting the document page selection 252 in the graphical user interface 122. Other document access mechanisms can include operating a load button or a pull-down menu button to select an open document function in order to load the document or web page associated with a selected link 127 or document identifier 128.

In step 423, in response to the user 108 activating the document access mechanism, the document viewer process 421 displays the document display area 137 on the graphical user interface 122.

Next, in step 424, the document viewer process 121 retrieves the contents of the document 134. The document viewer process 121 may retrieve the document contents 134, for example, from the document server process 161, or from a local document cache that the document viewer process 121 maintains for recently accessed documents 134 within the memory 112. The HTTP protocol may be used for this purpose thus allowing the document viewer process 121 to operate like a web browser.

In step 425, the document viewer process 121 displays the contents of the document 134 in the document display area 137 on the graphical user interface 122 to allow the user 108 to view the contents of the document 134. In this manner, the document viewer process 121 allows the user 108 to make an informed decision as to which document should be received by studying the correlation framework 135 which correlates the document properties for different documents against each other, thus allowing the user 108 to view this correlation to select a document 134 that most closely matches that user's requirements with respect to correlated document properties such as the age of the document, the size of the document in the retrieval time associated with the document.

Those skilled in the art will understand that there can be many variations made to the embodiments explained above while still achieving the same objective of those embodiments and the invention in general. For example, it is to be understood than in certain embodiments of the invention, different correlation frameworks 135-1 through 135-M can display different correlations of different document properties 132. In the illustrated examples, each correlation framework 135 correlates age, time and size properties. However, this does not always have to be the case. Thus some document properties may be included in some correlation frameworks 135 while other correlation frameworks may map the same or different document properties and may correlate a different number or less than all of the document properties. As an example, a two axes framework could be used to correlate two document properties. The user 108 may configure the document viewer process 121 to indicate which particular correlation frameworks 135 display correlations for which particular document properties 132.

According to another embodiment, the correlation framework can be something other that a three dimensional grid. For example, a translucent or semi-transparent sphere or globe like image can be used in which case the document viewer process can plot document identifiers 128 at location in quadrants of the globe that correspond to weighted values of document properties. Thus, a user 108 viewing such a graphical display can understand how the document properties relate to one another by the placement of the document identifier 128 within the sphere.

Such variations are intended to be covered by the scope of this invention. As such, the foregoing description of embodiments of the invention are not intended to be limiting. Rather, any limitations to the invention are presented in the following claims.

What is claimed is:

1. A method for accessing documents using a graphical user interface, the method comprising the steps of:
   accessing document properties for a document, the document properties indicating a size of the document, an age of the document, and a retrieval time required to obtain the document;
   rendering a document selection display that provides a document identifier associated with the document, the document identifier indicating, on the document selection display, a correlation between the size of the document, the age of the document, and the retrieval time associated with the document, said rendering comprising displaying a correlation framework as a multi-dimensional grid having a respective axis corresponding to each of size, age, and retrieval time of documents, the correlation framework including indices that provide a visual correlation between the sizes of documents, ages of documents, and retrieval times associated with documents, wherein the steps of accessing and rendering are performed for a plurality of documents using a single correlation framework, such that document identifiers displayed in the single correlation framework for respective documents in the plurality of documents provide an indication of document property relationships between the plurality of documents;
   displaying the document identifier within the correlation framework at a location that indicates the size of the document, the age of the document, and the retrieval time associated with the document in relation to the axes of the correlation framework to provide an indication of document property relationships for the document associated with the document identifier and wherein the document identifiers appear as plotted data points within said multidimensional grid;
   receiving a user document selection associated with the document identifier;
   displaying a document link display within the document selection display, the document link display including a document link associated with the document for which the document identifier is displayed on the correlation framework;
   wherein the step of receiving a user document selection associated with the document identifier comprises a step of receiving a user selection of the document link in the document link display associated with the document for which the document identifier is displayed on the correlation framework; and
   in response to receiving the user document selection, displaying at least a portion of the document properties associated with the document corresponding to the user document selection; and
   retrieving the document associated with the document identifier.

2. The method of claim 1 wherein the step of accessing document properties for a document comprises the steps of:
   detecting an update signal indicating that the document properties for the document should be updated;
   in response to the update signal:
      obtaining a document identity for the document;
      forwarding the document identity in a document property request signal to a document server process in order to obtain the document properties for the document identified by the document identity;
      receiving the document properties for the document in a document property response signal from the document server process; and
      storing the document properties in a document properties file.

3. The method of claim 2 wherein the update signal is automatically and periodically generated such that document properties for the document are automatically and periodically updated.

4. The method of claim 2 wherein, in response to the update signal, the step of accessing document properties for a document further comprises the steps of:
   forwarding a time request signal to a document server computer system operating the document server process;
   receiving a time response signal from the document server computer system operating the document server process, the time response signal indicating an available communications bandwidth to the document server computer system; and computing a time document property associated with the document based on the time response signal and a document property corresponding to the size of the document.

5. The method of claim 1 wherein:

the correlation framework is a first correlation framework that includes a first set of correlations between document properties for a first set of documents, and wherein the step of rendering a document selection display further includes the steps of:

displaying selections of multiple correlation frameworks on the graphical user interface, each selection associated with a respective correlation framework that provides a correlation between document properties associated with a respective set of documents;

receiving, from the selections of multiple correlation frameworks, a selection of a second correlation framework which correlates document identifiers for a second set of documents to be displayed on the document selection display; and in response to the step of receiving a selection of a second correlation framework, displaying the second correlation framework including indices that provide a visual correlation between the sizes, ages, and retrieval times associated with the second set of documents.

6. The method of claim 5 wherein the step of displaying the second correlation framework replaces the first correlation framework with the second correlation framework on the graphical user interface to present a visual correlation of document properties associated with the second set of documents.

7. The method of claim 1 wherein the step of displaying the document identifier within the correlation framework displays the document identifier according to a first perspective visual correlation and wherein the step of rendering a document selection display further comprises the steps of:

displaying at least one view control within the document selection display, the at least one view control allowing a user to manipulate the correlation framework;

detecting a view change operation on the at least one view control; and in response to the step of detecting, transforming the first perspective visual correlation to a second perspective visual correlation based on the view change operation.

8. The method of claim 1 wherein the document selection display includes a document access mechanism and wherein the step of receiving a user document selection associated with the document identifier includes the step of detecting operation of the document access mechanism; and wherein the step of retrieving the document associated with the document identifier is performed in response to the step of detecting operation of the document access mechanism and includes the steps of:

displaying a document display area on the graphical user interface;

retrieving contents of the document; and displaying the contents of the document in a document display area on the graphical user interface.

9. The method of claim 8 wherein the document access mechanism is at least one of:

i) a selection of a document identifier;

ii) a selection of a document link; and iii) a selection of a document page selection.

10. A computer system comprising:

an input output interface;

a communications interface;

a display;

a memory;

a processor; and an interconnection mechanism coupling the input output interface, the communications interface, the display, the memory and the processor;

wherein the memory is encoded with a document viewer application that when performed on the processor, produces a document viewer process that causes the computer system to display a graphical user interface on the display allowing a user to access documents by performing the operations of:

accessing document properties for a document, the document properties indicating at least one of a size of the document, an age of the document, and a retrieval time required to obtain the document;

rendering a document selection display on the graphical user interface that provides a document identifier associated with the document, the document identifier indicating, on the document selection display, a correlation between the size of the document, the age of the document, and the retrieval time associated with the document, the rendering including displaying, on the graphical user interface on the display, a correlation framework as a multi-dimensional grid including indices that provide a visual correlation between of the sizes of documents, ages of documents, and retrieval times associated with documents wherein the document viewer process performs the steps of accessing and rendering for a plurality of documents using a single correlation framework displayed on the graphical user interface on the display of the computer system, such that document identifiers displayed in the single correlation framework for respective documents in the plurality of documents provide an indication of document property relationships between the plurality of documents; and displaying, on the graphical user interface on the display, the document identifier within the correlation framework at a location that indicates the size of the document, the age of the document, and the retrieval time associated with the document in relation to the axes of the correlation framework to provide an indication of document property relationships for the document associated with the document identifier and wherein the document identifiers appear as plotted data points within said multi-dimensional grid;

receiving a user document selection associated with the document identifier via the input output interface;

displaying a document link display within the document selection display, the document link display including a document link associated with the document for which the document identifier is displayed on the correlation framework;

wherein the step of receiving a user document selection associated with the document identifier comprises a step of receiving a user selection of the document link in the document link display associated with the document for which the document identifier is displayed on the correlation framework; and in response to receiving the user document selection, displaying at least a portion of the document properties associated with the document corresponding to the user document selection; and retrieving the document associated with the document identifier via the communications interface.

11. The computer system of claim 10 wherein when the document viewer process causes the computer system to perform the step of accessing document properties for a document, the computer system performs the steps of:
  detecting an update signal indicating that the document properties for the document should be updated;
  in response to the update signal:
    obtaining a document identity for the document;
    forwarding the document identity in a document property request signal, via the communications interface, to a document server process in order to obtain the document properties for the document identified by the document identity;
    receiving, via the communications interface, the document properties for the document in a document property response signal from the document server process; and
    storing the document properties in a document properties file.

12. The computer system of claim 11 wherein the document viewer process automatically and periodically generates the update signal such that document properties for the document are automatically and periodically updated.

13. The computer system of claim 11 wherein in the step of accessing document properties for a document, the computer system further performs the steps of:
  forwarding a time request signal to a document server computer system operating the document server process;
  receiving a time response signal from the document server computer system operating the document server process, the time response signal indicating an available communications bandwidth to the document server computer system; and
  computing a time document property associated with the document based on the time response signal and a document property corresponding to the size of the document.

14. The computer system of claim 10 wherein:
  the correlation framework is a first correlation framework that includes a first set of correlations between document properties for a first set of documents; and
  wherein when the document viewer process causes the computer system to perform the step of rendering a document selection display, the document viewer process causes the computer system to further perform the steps of:
  displaying selections of multiple correlation frameworks on the graphical user interface, each selection associated with a respective correlation framework that provides a correlation between document properties associated with a respective set of documents;
  receiving, from the selections of multiple correlation frameworks, a selection of a second correlation framework which correlates document identifiers for a second set of documents to be displayed on the document selection display; and
  in response to the step of receiving a selection of a second correlation framework, displaying the second correlation framework including indices that provide a visual correlation between the sizes, ages, and retrieval times associated with the second set of documents.

15. The computer system of claim 14 wherein when the document viewer process causes the computer system to perform the step of displaying the second correlation framework, the document viewer process causes the computer system to replaces the first correlation framework with the second correlation framework on the graphical user interface on the display.

16. The computer system of claim 10 wherein when the document viewer process causes the computer system to perform the step of displaying the document identifier within the correlation framework, the computer system displays the document identifier according to a first perspective visual correlation on the display; and
  wherein when the document viewer process causes the computer system to perform the step of rendering a document selection display, the document viewer process causes the computer system to perform the steps of:
  displaying at least one view control within the document selection display, the at least one view control allowing a user to manipulate the correlation framework;
  detecting a view change operation on the at least one view control; and
  in response to the step of detecting, transforming the first perspective visual correlation to a second perspective visual correlation based on the view change operation.

17. The computer system of claim 10:
  wherein the document viewer process produces a document selection display on the display that includes a document access mechanism;
  wherein the document viewer process causes the computer system to perform the step of receiving a user document selection associated with the document identifier, wherein the document viewer process causes the computer system to perform the step of detecting operation of the document access mechanism; and
  wherein the document viewer process causes the computer system to perform the step of retrieving the document associated with the document identifier in response to the step of detecting operation of the document access mechanism, the document viewer process causes the computer system to perform the steps of:
    displaying a document display area on the graphical user interface on the display;
    retrieving a contents of the document; and
    displaying the contents of a document in a document display area on the graphical user interface.

18. The computer system of claim 17 wherein the document access mechanism is operated by a user using the input output interface to select, on the graphical user interface on the display, at least one of:
  i) a selection of a document identifier;
  ii) a selection of a document link; and
  iii) a selection of a document page selection.

19. A computer system comprising:
  an input output interface;
  a communications interface;
  a display;
  a memory;
  a processor; and
  an interconnection mechanism coupling the input output interface, the communications interface, the display, the memory and the processor;
  wherein the memory is encoded with a document viewer application that when performed on the processor, produces a document viewer process that provides a means for the computer system to display a graphical user interface on the display allowing a user to access documents, such means including:

means for accessing document properties for a document, the document properties indicating a size of the document, an age of the document, and a retrieval time for obtaining the document;

means for rendering a document selection display on the graphical user interface that provides a document identifier associated with the document, the document identifier indicating, on the document selection display, a correlation between the size of the document, the age of the document, and the retrieval time associated with the document, the means for rendering including means for displaying a correlation framework as a multidimensional grid including indices that provide a correlation between the sizes of documents, ages of documents, and retrieval times associated with documents, wherein the means for accessing and means for rendering are performed for a plurality of documents using a single correlation framework, such that document identifiers displayed in the single correlation framework for respective documents in the plurality of documents provide an indication of document property relationships between the plurality of documents;

means for displaying the document identifier within the correlation framework at a location that indicates the size of the document, the age of the document, and the retrieval time associated with the document in relation to the axes of the correlation framework to provide an indication of document property relationships for the document associated with the document identifier and wherein the document identifier appears as a plotted point within said multi-dimensional grid;

means for receiving a user document selection associated with the document identifier via the input output interface;

means for displaying a document link display within the document selection display, the document link display including a document link associated with the document for which the document identifier is displayed on the correlation framework;

wherein the means for receiving a user document selection associated with the document identifier comprises a step of receiving a user selection of the document link in the document link display associated with the document for which the document identifier is displayed on the correlation framework; and in response to receiving the user document selection, means for displaying at least a portion of the document properties associated with the document corresponding to the user document selection; and means for retrieving the document associated with the document identifier via the communications interface.

20. A computer program product having a computer-readable medium including computer program logic encoded thereon that, when performed on a computer system having a coupling of a memory, a processor, and a display provides a method for accessing document content using a graphical user interface on the display of the computer system by performing the operations of:

accessing document properties for a document, the document properties indicating a size of the document, an age of the document, and a retrieval time for obtaining the document;

rendering a document selection display that provides a document identifier associated with the document, the document identifier indicating, on the document selection display, a correlation between the size of the document, the age of the document, and the retrieval time associated with the document, the rendering including displaying a correlation framework as a multidimensional grid including axes that provide a correlation between the sizes of documents, ages of documents, and retrieval times associated with documents, wherein the steps of accessing and rendering are performed for a plurality of documents using a single correlation framework, such that document identifiers displayed in the single correlation framework for respective documents in the plurality of documents provide an indication of document property relationships between the plurality of documents;

displaying the document identifier within the correlation framework at a location that indicates the size of the document, the age of the document, and the retrieval time associated with the document in relation to the axes of the correlation framework to provide an indication of document property relationships for the document associated with the document identifier and wherein the document identifier appears as a plotted point within said multi-dimensional grid;

receiving a user document selection associated with the document identifier;

displaying a document link display within the document selection display, the document link display including a document link associated with the document for which the document identifier is displayed on the correlation framework;

wherein the step of receiving a user document selection associated with the document identifier comprises a step of receiving a user selection of the document link in the document link display associated with the document for which the document identifier is displayed on the correlation framework; and in response to receiving the user document selection, displaying at least a portion of the document properties associated with the document corresponding to the user document selection; and retrieving the document associated with the document identifier.

21. A method for correlating document information using a graphical user interface, the method comprising the steps of:

displaying a correlation framework as a multidimensional grid including indices that provide a correlation between document properties wherein the document properties include sizes of documents, ages of documents, and retrieval times for obtaining the documents;

displaying a document identifier as plotted data points within the correlation framework at a location on the correlation framework that provides an indication of values associated with document properties of the document associated with the document identifier, thus providing an indication of document property values for document properties of the document associated with the document identifier, wherein the steps of displaying a correlation framework and displaying a document identifier are performed for a plurality of documents using a single correlation framework, such that document identifiers displayed in the single correlation framework for respective documents in the plurality of documents provide an indication of document property relationships between the plurality of documents;

receiving a selection of the document identifier from within the correlation framework;

displaying a document link display within the document selection display, the document link display including a document link associated with the document for which the document identifier is displayed on the correlation framework;

wherein the step of receiving a user document selection associated with the document identifier comprises a step of receiving a user selection of the document link in the document link display associated with the document for which the document identifier is displayed on the correlation framework; and in response to receiving the user document selection, displaying at least a portion of the document properties associated with the document corresponding to the user document selection; and accessing the document associated with the document identifier in response to receiving the selection of the document identifier associated with the document.

22. A method for accessing documents using a graphical user interface, the method comprising the steps of:

accessing document properties for a document, the document properties indicating a size of the document, an age of the document, and a time property indicating the play time of the file;

rendering a document selection display that provides a document identifier associated with the document, the document identifier indicating, on the document selection display, a correlation between the size of the document, the age of the document, and the play time associated with the document, said rendering comprising displaying a correlation framework as a multi-dimensional grid having a respective axis corresponding to each of size, age, and play time of documents, the correlation framework including indices that provide a visual correlation between the sizes of documents, ages of documents, and play times associated with documents;

displaying the document identifier within the correlation framework at a location that indicates the size of the document, the age of the document, and the play time associated with the document in relation to the axes of the correlation framework to provide an indication of document property relationships for the document associated with the document identifier and wherein the document identifiers appear as plotted data points within said multidimensional grid;

receiving a user document selection associated with the document identifier; and retrieving the document associated with the document identifier.

23. The method of claim 22, wherein the steps of accessing and rendering are performed for a plurality of documents using a single correlation framework, such that document identifiers displayed in the single correlation framework for respective documents in the plurality of documents provide an indication of document property relationships between the plurality of documents.

* * * * *